United States Patent Office 3,321,551
Patented May 23, 1967

3,321,551
NOVEL RESIN AND METHOD FOR PRODUCING SAME
Knut Emil Stig Knutsson, Stockviksverken, Sweden, assignor to Fosfatbolaget AB, Stockholm, Sweden, a company of Sweden
No Drawing. Filed July 27, 1965, Ser. No. 475,228
Claims priority, application Sweden, Apr. 6, 1960, 3,390/60
9 Claims. (Cl. 260—840)

This is a continuation-in-part of copending application Ser. No. 99,347, filed Mar. 30, 1961 and now abandoned.

This invention generally relates to a novel process for producing resins of improved properties. More specifically this invention pertains to a process for producing phenol modified melamine-aldehyde resins (condensation products) having improved properties and having at least one mol of melamine for each mol of phenol.

Background

It is known in the prior art to prepare synthetic resins and molding compositions from melamine and phenol by co-condensation or by the process of combining a phenolic and a melamine resin, each being prepared in separate reaction vessels.

In preparing the aforementioned co-condensation products, melamine and phenol are mixed together and then reacted with an aldehyde. It is also known to condense melamine with an aldehyde and then to add phenol and possibly a further amount of aldehyde. These methods have resulted in resinous products having a number of desirable properties; but it has not been possible to eliminate the inherent disadvantage that the phenol will impart a light brown to red-brown color to the resin and to any articles subsequently molded from these resins.

To compensate for this discoloration, it has heretofore been necessary to add up to 20 percent of a white pigment (such as titanium dioxide, lithopone or zinc oxide) as well as an anti-oxidant. However, even with these changes, phenol modified resins have only gained a limited use because their inherent red-brownish color (1) makes dyeing with light or pastel shades either difficult or impossible and (2) renders their stability to light very poor. Accordingly, those skilled in this art have long been seeking some means to overcome these undesirable features so that molded articles of white or pastel color could be produced.

Objects

The primary object of this invention is to produce novel and improved phenol modified melamine-aldehyde resins. Another object of this invention is to produce phenol modified melamine-aldehyde resins which are colorless or almost colorless. An additional object of this invention is to produce phenol-melamine-formaldehyde resins, which because of their very desirable color properties, can be admixed with a wide variety of fillers, pigments and other resins. Other objects and advantages will become more apparent after reading the following specific description.

The invention broadly

Considered broadly, the present invention involves a process for producing substantially colorless resinous products which comprises the following sequence of steps:

(a) Providing a supply of a hydroxy aromatic compound, such as phenol or substituted phenols, (b) Providing a separate acidic solution of an aldehyde, (c) Reacting said hydroxy aromatic compound with said acidic solution of aldehyde to thereby produce a water-soluble precondensate, (d) Neutralizing said water-soluble precondensate with a selected neutralizing agent, (e) Reacting said neutralized water-soluble precondensate with melamine or melamine admixed with lesser amounts of alkyl- or aryl-substituted aminotriazines.

The invention more specifically

More specifically the present invention involves providing a supply of phenol, providing a separate supply of an acidic solution of formaldehyde and then bringing said phenol and said acidic solution of formaldehyde together in a reaction zone. The molar ratio of formaldehyde to phenol shall be at least 1:1, preferably at least 1.2:1 in order to provide every phenol nucleus with a methylol group or methylene linkage before the second stage of the process takes place. It was discovered that the methylol phenol is less subject to discoloration than the phenol itself.

The acidic solution of formaldehyde consists of commercial formalin (which is an approximately 37 percent aqueous solution of formaldehyde containing up to 0.02 percent of formic acid). The contents of the reaction zone are preferably stirred and the reaction zone usually is provided with means for heating or cooling the contents thereof so as to maintain a desired reaction temperature. The reaction temperature is not critical and may be varied depending upon such factors as the properties wanted in the end product, the desired speed of the reaction, etc. A preferred temperature range is about 80–85° C. The reaction time is likewise not critical, but is preferably in the neighborhood of about one hour. The pH in the reaction zone is usually within the range of about 3–3.5.

The water-soluble precondensate formed in the reaction zone, primarily consisting of methylene and/or methylol derivatives of phenol, is then introduced into a neutralization zone. As neutralizing agent a carbonate selected from the group consisting of the carbonates of Ca, Ba and Mg is employed. Said carbonates are added before proceeding with the second stage of the process. The use of the specified neutralizing agents leads to only slightly alkaline conditions in stage 2, that is, a pH of about 6.9–7.8. Said carbonates are self-regulating in that an excess of carbonate can be filtered away. The neutralizing agent is preferably added in excess and the excess neutralizing agent is later removed by a decanting and/or filtration step. After neutralization and after decanting and/or filtration a clear solution results. Strong alkalis such as sodium hydroxide or potassium hydroxide are not suitable for practicing the invention since they produce brown-colored solutions due to the oxidation of free phenol.

Using a stronger alkali, the pH is highly dependent on the amount of alkali added. Concurrently, a high pH involves the risk of discoloration. Further, the presence of strong alkali will cause the formation of alkali phenolates which often are discolored per se.

The resulting clear resinous solution is then introduced into a second reaction zone together with melamine, the amount of melamine added being sufficient to obtain a molar ratio of melamine to phenol of at least 1:1. While large amounts of melamine may be employed, a molar ratio of at least 1:1 to about 5:1 is preferred, or in other words, 1:0.2–1. It has been found satisfactory, in respect to the ratio of melamine to formaldehyde, to carry out the process with a molar ratio of melamine to formaldehyde within the range of about 1:1.5 to 1:2.0, greater or lesser amounts of formaldehyde may be employed which is easily determinably by routine experimentation and by adherence to the stated ratios of melamine to phenol and formaldehyde to phenol.

In practicing the process of the invention, it is preferred that all of the required formaldehyde be added in the first stage together with the phenol. As stated hereinabove, the molar ratio of formaldehyde to phenol shall be at least 1:1, preferably at least 1.2:1. While larger amounts of formaldehyde may be employed, it is preferred to use a molar ratio of formaldehyde to phenol which is between at least 1:1 to about 3.2:1; particularly, when the molar ratio of melamine to phenol is 2:1. A suitable total molar ratio of melamine-phenol-formaldehyde is about 1:0.2–1.0:1.7–3.2.

The temperature of the second reaction zone may vary considerably but a temperature within the range of about 80–85° C. has been found to be quite suitable. A reaction time of about one hour has been found to be quite satisfactory although longer or shorter times can be used.

The formaldehyde for reaction with melamine may be added in the second stage but then two formaldehyde additions have to be neutralized as previously mentioned. In order to have only one neutralizing step, in practice, all formaldehyde is added in the first stage. Both reaction stages may, obviously, be carried out in the same vessel by successive additions of the reaction components stated.

The resulting phenol-melamine-aldehyde resin has the following desirable properties:

(a) colorless or almost colorless,
(b) produces molding compounds of only slightly inherent color and which have:

(1) unlimited dyeability,
(2) excellent light and heat stability,
(3) improved shock resistance,
(4) improved machining properties.

By adding a phenol modified melamine-aldehyde resinous solution prepared as described to a urea-aldehyde resinous solution a composite phenol-melamine-urea resin is prepared which if used as a molding compound will yield molded articles with considerably lower water absorption and improved electrical properties compared with articles produced from common urea-molding compounds.

The resinous solution obtained may be dried to obtain the resin in solid powder form and can also be used for producing thermosetting molding compounds or molding powders by methods known per se containing reinforcing fillers and lubricants, catalysts, pigments and dyes. When cellulosic fillers, e.g., α-cellulose, are used, the resinous content of the compound should preferably be 60–70 percent and when mineral fillers are used, e.g., asbestos, the resinous content should preferably be 40–50 percent. The drying of the resin solution impregnated filler should be carried out at a maximum temperature of about 90° C. The use of a higher drying temperature will run the risk of causing a slightly yellow color. To achieve complete whiteness of the molded articles an addition to the molding compound of only about 3–5 percent of a white pigment is required.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise specified.

*Example 1*

94 g. of phenol and 258 g. of an aqueous 37 percent solution of formaldehyde (commercial formaline) are introduced into a reaction vessel provided with a stirrer and a jacket for heating and cooling. The temperature is raised to about 80–85° C. and the reaction is completed after one hour. It is not necessary to add any catalyst, because the content of formic acid in the formaline resulted in a pH of about 3–3.5. Magnesium carbonate in an amount of about 0.5 gram is then added to obtain a pH of the resinous solution of about 6.9–7.1 and the mixture stirred for about 15 minutes in order to complete the neutralization. The autoclave charge is then drained off and filtered and the resulting clear solution is introduced into the vessel again together with 252 g. of recrystallized melamine. (The molar ratio of melamine-phenol-aldehyde is about 1:0.5:1.6.) After reacting one hour, condensation progressed to the desired degree, which is determinable by taking out samples, which give precipitation when a 50 percent ethanol solution is added. (1 part by volume of the sample per 4 parts by volume of the ethanol.) Upon completion of the reaction a resinous solution is obtained which can be stored for more than 10 days.

*Example 2*

In this example, a series of resinous solutions are prepared in the manner described in Example 1, using three different neutralization agents, viz magnesium carbonate, sodium carbonate and sodium hydroxide in amounts sufficient to obtain a pH of about 6.9 to 7.1 measured by a glass-electrode. For each neutralizing agent, three different molar ratios of melamine to phenol are used. From the resinous solutions molding compositions are prepared by admixing alpha-cellulose therewith and drying the mixture at about 80–90° C. All compositions are the same with the exception of the particular neutralizing agent employed and the molar ratio of melamine to phenol. It should be noted that the molding compositions are prepared only from alpha-cellulose and the resinous solution without the addition of any white pigment or dye. From the thus prepared molding compositions, test specimens are prepared by molding at a temperature of 150° C. and a pressure of 200 kg./cm.² for testing heat stability (discoloration) and light fastness.

The discoloration of the specimens are determined by a reflectometer with mono-chromatic light of a wavelength of 415 millimicrons (expressing the luminous reflectance). The reflected flux of each specimen is determined in a Bausch & Lomb colorimeter "Spectronic 20" by means of a photocell, the scale of which is calibrated to the figure 100 for the reflected flux from a magnesium carbonate tile (pure white). Hence, a higher photometer figure (reflected flux) means a whiter, less discolored specimen. The results of the test are tabulated in Table I below which shows the marked superiority of the specimens prepared from a composition in accordance with the invention; that is, a neutralizing agent of magnesium carbonate and a molar ratio of melamine to phenol of at least 1:1. From Table I, it is apparent that the lowest figure for the compositions prepared in accordance with the invention is 68. The figures for all other specimens are markedly lower than 68 which proves that the products prepared in accordance with the invention are superior in respect to discoloration and heat stability or fastness.

TABLE I

| Neutralizing Agent | Molar Ratio of Melamine to Phenol | Reflected Flux | |
|---|---|---|---|
| | | Original (Without Heat Treatment) | After Heat Treatment at 100° C. for 100 Hours |
| Magnesium Carbonate | 2:1 | 80 | 76 |
| | 1:1 | 76 | 68 |
| | 1:1.5 | 61 | 58 |
| Sodium Hydroxide | 2:1 | 61 | 58 |
| | 1:1 | 55 | 44 |
| | 1:1.5 | 50 | 48 |
| Sodium Carbonate | 2:1 | 57 | 49 |
| | 1:1 | 47 | 36 |
| | 1:1.5 | 34 | 34 |

The specimens having a molar ratio of melamine to phenol of 1:1 are tested for light fastness in a "Weather-O-Meter," type DMC–HR manufactured by Atlas Electric Devices Co., Chicago, Illinois at a light exposure of 380 hours and an air temperature of less than 60° C. After the exposure, the reflected flux is measured in the same manner as described hereinabove. The results of the test are tabulated in Table II below which shows the superior light fastness of the product prepared in accordance with the invention:

TABLE II

| Neutralizing Agent | Molar Ratio of Melamine to Phenol | Reflected Flux | |
|---|---|---|---|
| | | Original | After Exposure |
| Magnesium Carbonate | 1:1 | 76 | 75 |
| Sodium Hydroxide | 1:1 | 55 | 51 |
| Sodium Carbonate | 1:1 | 47 | 42 |

*Example 3*

A phenol-formaldehyde-melamine-urea resin is prepared as follows:

10.5 cm.³ concentrated aqueous ammonia (25%) and 0.5 g. of magnesium carbonate are added to 400 g. of an aqueous solution of 37 percent formaldehyde. The solution is heated up to 75° C. while stirring and 192 g. of urea are added. The molar ratio of urea-formaldehyde is 1:1.56. After condensation for one hour at 75° C. with stirring the solution is filtered.

65 g. of phenol and 218 g. of an aqueous 37 percent solution of formaldehyde are reacted in a reaction vessel at 80-85° C. for one hour while stirring. 0.3 g. of magnesium carbonate are then added and admixed 15 minutes, and the solution then filtered. 117 g. of melamine and the filtered solution are then introduced into the reaction vessel. The molar ratio of melamine-phenol-aldehyde is about 1:0.75-2.9. The mixture is heated to 80-85° C. and condensed while stirring until a degree of condensation corresponding to precipitation by adding 50 percent ethanol in the ratio 1:4 is attained. The solution of the urea-aldehyde condensate are then mixed and kneaded with 355 g. of α-cellulose over a period of 30 minutes. After drying at 70-80° C. the molding compound had the following composition:

| | Percent |
|---|---|
| Carbamide | 20.7 |
| Formaldehyde | 24.7 |
| Phenol | 7.0 |
| Melamine | 12.6 |
| Cellulose | 35.0 |

After admixture of 5 percent of lithopone and 0.5–1 percent of a urea resin hardener the compound was ready for molding.

Test specimens were produced as described in Example 2 and the following properties were recorded:

| | |
|---|---|
| Specific gravity | 1.45–1.50 |
| Mold shrinkage (percent) | 0.5–0.7 |
| Light stability British Standard without pigment) 1006 | 7–8 |
| Water adsorption per A.S.T.M. D-507 (percent) | 0.35 |
| Flexural strength A.S.T.M. D-790 (p.s.i.) | 14,600 |

Those skilled in the chemical arts and particularly in the art in which this invention pertains will readily appreciate that many modifications of the basic invention set forth in the specification are possible. For example, instead of using a phenol alone one may use phenol and a substituted phenol such as cresol or xylenol. Similarly, instead of using formaldehyde alone, part of the formaldehyde may be substituted by another aldehyde such as acetaldehyde, benzaldehyde or a compound splitting off an aldehyde such as paraformaldehyde. Also instead of using melamine alone one could use mixtures of melamine with lesser amounts, e.g. 20 molar percent of alkyl- or aryl-substituted amino triazines, such as acetoguanamine or benzoguanamine. Likewise, other fillers and pigments other than those specifically set forth in the examples could be used and hardeners such as phthalic acid or phthalic acid anhydride can be admixed with the phenol-melamine-aldehyde final product.

It is also possible that other closely related compounds in addition to those mentioned in the disclosure, and homologs of closely related compounds might function with results equally as satisfactory as the herein specifically described compounds might function with results equally as satisfactory as the herein specifically described compounds and there would certainly be no invention involved in trying such related material in view of the present broad disclosure. All of these modifications are considered to be within the scope of the present claims by virtue of the well established "doctrine of equivalents."

What is claimed is:

1. A process for producing substantially colorless resinous products which comprises the following sequence of steps:
   (a) providing a supply of phenol;
   (b) providing a separate acidic solution of formaldehyde containing about 0.02% of formic acid;
   (c) reacting said phenol with said acidic solution of formaldehyde to thereby produce a water-soluble precondensate, the molar ratio of formaldehyde to phenol being at least 1:1;
   (d) neutralizing said water-soluble precondensate with a neutralizing agent selected from the group consisting of the carbonates of Ca, Ba and Mg to obtain a pH of between about 6.9 and about 7.8; and
   (e) reacting said neutralized water-soluble precondensate with melamine, the molar ratio of melamine to phenol being at least 1:1.

2. A process for producing substantially colorless resinous products which comprises the following sequence of steps:
   (a) providing a supply of phenol;
   (b) providing a separate acidic solution of formaldehyde containing about 0.02% of formic acid;
   (c) reacting said phenol with said acidic solution of formaldehyde to thereby produce a water-soluble precondensate, the molar ratio of formaldehyde to phenol being within the range of from at least 1:1 to about 3.2:1;
   (d) neutralizing said water-soluble precondensate with a neutralizing agent selected from the group consisting of the carbonates of Ca, Ba and Mg to obtain a pH of between about 6.9 and about 7.8; and
   (e) reacting said neutralized water-soluble precondensate with melamine, the molar ratio of melamine to phenol being within the range of from at least 1:1 to about 5:1.

3. A process for producing substantially colorless resinous products which comprises the following sequence of steps:
   (a) providing a supply of phenol;
   (b) providing a separate acidic solution of formaldehyde, the molar ratio of formaldehyde to phenol being between about 1.2:1 to about 3.2:1;
   (c) reacting said phenol with said acidic solution of formaldehyde to thereby produce a water-soluble precondensate, the reaction temperature being between about 80 to about 85° C., the pH being within the range of about 3 to about 3.5, and the reaction time being about one hour;
   (d) neutralizing said water-soluble precondensate with a neutralizing agent selected from the group consisting of the carbonates of Ca, Ba and Mg to obtain a pH between about 6.9 and about 7.8; and
   (e) reacting said neutralized water-soluble precondensate with melamine, the molar ratio of melamine to phenol being within the range of from 1:1 to about 5:1.

4. A process for producing substantially colorless resinous products which comprises the following sequence of steps:
(a) providing a supply of phenol;
(b) providing a separate acidic solution of formaldehyde containing about 0.02% of formic acid;
(c) reacting said phenol with said acidic solution of formaldehyde to thereby produce a water-soluble precondensate, the molar ratio of formaldehyde to phenol being within the range of from 1:1 to about 3.2:1;
(d) neutralizing said water-soluble precondensate with magnesium carbonate to obtain a pH between about 6.9 and about 7.8; and
(e) reacting said neutralized water-soluble precondensate with melamine, the molar ratio of melamine to phenol being within the range of from 1:1 to about 5:1.

5. A process according to claim 1 wherein said neutralized water-soluble precondensate is filtered to remove any excess of neutralizing agent prior to contacting with melamine.

6. A process according to claim 1 wherein the product resulting from the reaction between said neutralized water-soluble precondensate and melamine is added to a solution of a urea-aldehyde resin.

7. A process according to claim 1 wherein the reaction product of the neutralized water-soluble precondensate and melamine is admixed with a filler.

8. A product prepared by the process of claim 1.

9. A product prepared by the process of claim 2.

References Cited by the Examiner

UNITED STATES PATENTS

| | | | |
|---|---|---|---|
| 2,593,926 | 4/1952 | Simons | 260—57 |
| 3,004,941 | 10/1961 | Mestdagh et al. | 260—29.3 |
| 3,070,572 | 12/1962 | Oland et al. | 260—839 |

FOREIGN PATENTS 245,639  6/1960  Australia.

WILLIAM H. SHORT, *Primary Examiner.*

H. E. SCHAIN, *Assistant Examiner.*